Aug. 20, 1946.  H. NUTT  2,406,244
FRICTION CLUTCH
Filed May 24, 1943
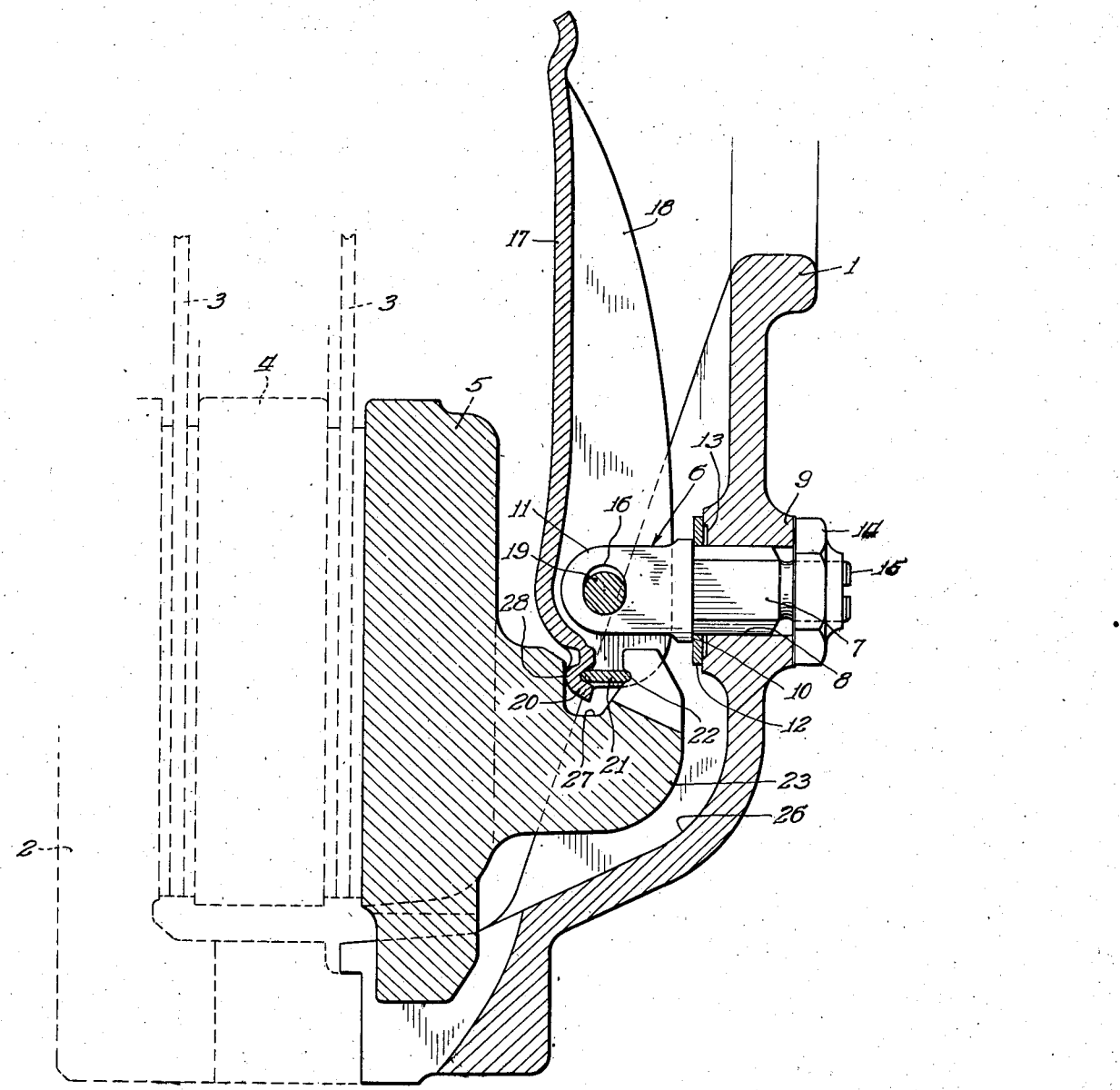
Inventor:
Harold Nutt
By: Edward C. Fitzhugh
Atty.

Patented Aug. 20, 1946

2,406,244

UNITED STATES PATENT OFFICE 2,406,244

FRICTION CLUTCH

Harold Nutt, Chicago, Ill., assignor to Borg-Warner Corporation, Chicago, Ill., a corporation of Illinois Application May 24, 1943, Serial No. 488,163

7 Claims. (Cl. 192—99)

This invention relates to friction clutches of the type employed in motor vehicles and has as its general object to provide an improved mechanism for mounting the release levers and connecting them to the pressure plate of a clutch of this type.

A specific object of the invention is to eliminate the necessity for the conventional hold-back spring. A further object of the invention is to provide an improved adjustable mounting for the lever fulcrum eye bolt. The invention in this respect is particularly applicable to a heavy duty clutch of a type employing a cast metal cover.

These and other objects and features of this invention will become apparent from the following specification when taken together with the accompanying drawing which shows an axial sectional view through a portion of a clutch embodying the invention.

As an example of one form in which the invention may be embodied, the drawing shows a heavy duty clutch adaptable for use in military tanks. Such a clutch may embody a cover 1 of cast metal such as cast steel, suitably connected to a driving member, indicated in broken lines at 2. Twin driven discs 3 and an intervening, floating pressure plate 4, likewise indicated in broken lines, are adapted to be packed in frictional engagement with each other and with a pressure plate 5 and the driving member 2 by pressure transmitted through the lever mechanism forming the subject matter of my invention.

My improved lever mechanism embodies a lever fulcrum eye bolt 6 having a prism-shaped shank 7 received in a correspondingly shaped aperture 8 in a boss 9 formed in the cover 1.

A shoulder 10 at the base of the head portion 11 of the eye bolt 6 is engaged against the inner portion of a Belleville washer 12 which in turn is engaged at its periphery against the inner end of the boss 9. Inwardly of the radius where it is engaged with the Belleville washer spring 12, the boss 9 is counter-bored to provide an annular space 13 into which the inner portion of the spring 12 may be flexed if necessary.

The spring 12 is pressed from a normally conical shape to the flat washer shape shown in the drawing and is thus adapted to move a limited extent on either side of the flat plane of its flat washer shape in order to accommodate the adjustment of the eye bolt 6 toward and from the pressure plate 5. Such adjustment is effected by rotating a nut 14 threaded on the reduced threaded end 15 of the eye bolt, and engaging the outer end of the boss 9.

The Belleville washer 12 takes over the function of the former hold back spring in maintaining the adjusting nut in snug engagement with the cover member at all times. Thus the Belleville washer in combination with the snug fitting characeristics of the pivot pin and strut, eliminates the necessity for the hold back spring.

The Belleville washer has the further function of providing a substantially constant positioning load on the eye bolt throughout the normal range of adjustment thereof. For this purpose, the washer is designed so as to have a zero rate deflection characteristic.

The Belleville washer 12 is sufficiently stiff to resist the axial component of centrifugal force that may be developed in the lever 17 when the weight of the latter is centered rearwardly (to the right as viewed in the drawing) of the pivot pin 19, as when the lever is in engaged position after the facings have become worn so that the packed thickness of the driven member assemblies is reduced. It will be apparent that such a centrifugal force, in conjunction with the toggle arrangement of the outer end of the lever and the head of the eyebolt, would develop a component tending to press the eyebolt rearwardly and against the Belleville washer 12.

In conventional lever arrangements of this general type it has been customary to provide the eye bolt with a tail portion extending through the lever and into a recess in the pressure plate in order to provide adequate support against the outward pressure of the lever, acting under centrifugal force, against the eye bolt. Because of the close fit of the shank 7 in the aperture 8 for a substantial axial distance, this tail portion may be and is eliminated by the present invention. The extended fit of the shank 7 in the aperture 8, in connection with the non-circular cross-sectional shape of these parts, also makes it possible to utilize the eye bolt as the means for supporting the lever 17 against displacement about the axis of the eye bolt, the head portion 11 being formed with flat sides snugly fitting between the wall portions 18 of the lever to effect this purpose. Thus the conventional practice of fitting the side wall portions of the lever over a part of the pressure plate lug so as to support the lever against displacement about the axis of the eyebolt, is eliminated.

The head portion 11 of the eye bolt 6 is provided with an eye 16 which is elongated transversely of the bolt. A release lever 17, of channelled construction having side walls 18 embracing the head 11, is pivoted to the eye bolt by a pintle 19 mounted in the side walls 18 and extending through the eye 16. The pintle 19 has very slight clearance in the eye 16 longitudinally of the bolt, thus eliminating backlash between the lever 17 and the eye bolt in a direction parallel to the clutch axis.

The outer end of the lever 17 is formed with a saddle 20 in which is seated one end of a strut 21 the other end of which is seated in a notch 22 in a driving lug 23 formed on the pressure plate 5. The driving lug 23 is received in and adapted to have driving engagement with a pocket 26 formed in the cover 1.

The saddle 20 and strut 21 are accommodated with only slight clearance in a recess 27 in the driving lug 23, so as to eliminate back-lash between the outer end of the lever and the pressure plate. As a result of eliminating back-lash at this point and in the eye 16, it has been possible to eliminate the hold back spring conventionally employed for reducing back-lash in the lever linkage.

I claim:

1. In combination with a pair of clutch members one having a recess, a fulcrum element carried by the other member free of the first member, said fulcrum element having a non-circular region and an eye, a lever having a pivot pin fulcrumed in said eye, and an end portion projecting into said recess, means on said lever snugly fitting said non-circular region to maintain said lever against displacement around said element, and a strut interposed between said end portion and one side of said recess, said strut maintaining said end portion in bearing relation with respect to the other side of said recess so as to eliminate any appreciable back-lash between said end portion and said recessed clutch member, said pivot pin being fitted in said eye with sufficient snugness transversely of the lever to eliminate any appreciable back-lash therein, whereby the necessity for a hold back spring is eliminated.

2. In combination with a pair of clutch members one having a recess defined between opposed surfaces, a fulcrum element carried by the other member and having a non-circular region and an eye, a lever having a pivot pin extended through said eye and an end portion in the form of a saddle having a convex surface in bearing relation with respect to one of said opposed surfaces, said lever having side portions fitting said non-circular region thereby preventing sidewise displacement of said lever, a strut having one end received in said saddle and its other end fulcrumed against the other of said opposed surfaces, said strut and saddle together filling the space between said opposed surfaces with only slight clearance so as to eliminate any appreciable back-lash between said end portion and said recessed clutch member, and said eye being elongated longitudinally of said lever to permit said pin to have rolling contact therewith and embracing said pin snugly in a direction transversely of said lever so as to eliminate any appreciable back-lash between the lever and said fulcrum element in this direction, whereby the necessity for a hold-back spring is eliminated.

3. In combination with a pair of clutch members, an operating lever having a portion fulcrumed with reference to one of said members and having a pivot pin, an eye bolt having a non-cylindrical shank fitted into a correspondingly shaped aperture in the other member, said eye bolt having a head in which said pivot pin is fulcrumed, a Belleville washer interposed between said head and said other member with said head engaged against the inner portion of said washer and said other member having a recess defined within a raised annular fulcrum against which the peripheral portion of said washer is engaged, and an adjusting nut threaded on the end of said eye bolt opposite said head and engaging said other member on the side thereof opposite said Belleville washer.

4. The combination defined in claim 3, wherein said Belleville washer is stressed to a substantially flat plane and is capable of being stressed into said recess on one side of said plane or becoming unstressed to a position lying on the other side of said plane.

5. The combination defined in claim 3, wherein said eye bolt head has flat side faces embraced by side wall portions of said lever and thereby holds said lever against displacement about the axis of said eye bolt.

6. A combination as defined in claim 3, wherein said end portion of the lever is received in a recess in said one member, and including a strut interposed between one side of said recess and said lever end portion, the latter being maintained by said strut in close proximity to the other side of said recess so as to eliminate back-lash in said recess, and said pivot pin being fitted in said eye with no backlash therein, whereby the necessity for a holdback spring is eliminated.

7. A clutch comprising a driving member; a clutch pressure plate coacting therewith having a recess; a cover plate carried by said driving member; a shouldered fulcrum member adjustably carried by said cover and having an eye and a flattened region adjacent said eye; a lever having a pivot pin fulcrumed in said eye and an end portion projecting into said recess, said lever having a channeled portion snugly fitting the flattened region of said fulcrum member for maintaining said lever against displacement around the axis of said fulcrum member; a Belleville type spring washer on said fulcrum member in tensioned relation to the shoulder thereon, and a strut interposed between said end portion of the lever and a side of said recess, said strut maintaining said lever end portion in bearing relation with respect to the opposite side of said recess so as to eliminate any appreciable back-lash between said end portion and said pressure member, said pivot pin being fitted in said eye with sufficient snugness tranversely of said lever to eliminate any appreciable back-lash therein, whereby the necessity for a hold-back spring is eliminated.

HAROLD NUTT.